United States Patent [19]

DeVoe et al.

[11] Patent Number: 5,066,371

[45] Date of Patent: Nov. 19, 1991

[54] REMOVAL OF CONTAMINANTS AND RECOVERY OF METALS FROM WASTE SOLUTIONS

[75] Inventors: Irving W. DeVoe, Thousand Oaks, Calif.; Olwyn A. D'Sylva, Montreal, Canada; David A. Fine, Santa Monica, Calif.

[73] Assignee: Metanetix, Inc., Camarillo, Calif.

[21] Appl. No.: 316,201

[22] Filed: Feb. 24, 1989

[51] Int. Cl.[5] .......................... C02F 1/46; C02F 1/42
[52] U.S. Cl. .................................. 204/149; 210/688; 210/661; 210/670; 210/676
[58] Field of Search ................. 204/149; 210/688, 661, 210/670, 676

[56] References Cited

U.S. PATENT DOCUMENTS

| | | | |
|---|---|---|---|
| 2,765,913 | 10/1956 | Weiss et al. | 210/42.5 |
| 3,174,927 | 3/1965 | Cross et al. | 210/33 |
| 3,445,382 | 5/1969 | Wace | 210/661 |
| 3,607,739 | 9/1971 | Thorburg | 210/33 |
| 3,679,581 | 7/1972 | Kunz | 210/676 |
| 4,148,631 | 4/1979 | Babjak et al. | 204/112 |
| 4,153,522 | 5/1979 | Arbiter et al. | 204/112 |
| 4,279,755 | 7/1981 | Himsley | 210/661 |
| 4,294,434 | 10/1981 | Durkee | 266/170 |
| 4,304,599 | 12/1981 | Durkee | 75/109 |
| 4,330,386 | 5/1982 | Korinek et al. | 204/223 |
| 4,604,209 | 8/1986 | Himsley | 210/661 |
| 4,624,704 | 11/1986 | Byeseda | 210/688 |
| 4,661,258 | 4/1987 | Phillips | 210/661 |
| 4,764,276 | 8/1988 | Berry et al. | 210/264 |
| 4,789,463 | 12/1988 | Reynolds | 208/252 |
| 4,806,236 | 2/1989 | McCormack | 210/94 |
| 4,824,576 | 4/1989 | Sood et al. | 210/688 |
| 4,828,712 | 5/1989 | Reynolds et al. | 210/688 |

*Primary Examiner*—John F. Niebling
*Assistant Examiner*—Arun S. Phasge
*Attorney, Agent, or Firm*—Nilsson, Robbins, Dalgarn, Berliner, Carson & Wurst

[57] ABSTRACT

A method for removal of at least one contaminant from a liquid is described, wherein a first step in liquid is introduced into a first of a plurality of liquid treatment containers and brought into contact in a liquid-medium suspension with a first quantity of a solid contaminant recovery medium for removing the contaminant for a period of time sufficient to achieve a desired efficiency of recovery of the contaminant. The liquid is then cycled from the first liquid treatment container sequentially through each of the plurality of liquid treatment containers to a final liquid treatment container while contacting the liquid in each of the liquid treatment containers with additional quantities of the medium in liquid-medium suspension for periods of time sufficient to achieve the desired efficiency of recovery in each of the liquid treatment containers. At least a portion of the medium is cycled from the final liquid treatment container through the plurality of liquid treatment containers to the first liquid treatment container in a direction countercurrent to flow of the liquid so as to maintain essentially a constant medium concentration in each of the liquid treatment containers, with the medium being substantially separated from liquid prior to cycling from one container to another container. At least a portion of the medium is transferred from the first liquid treatment container into a medium recycling means, in which the medium is treated with a contaminant recovery liquid for regenerating the medium.

14 Claims, 5 Drawing Sheets

REMOVAL OF CONTAMINANTS AND RECOVERY OF METALS FROM WASTE SOLUTIONS

BACKGROUND OF THE INVENTION

This application is directed to an integrated process that will remove metals and/or other contaminants from aqueous solutions rapidly, efficiently and continuously, and preferably convert metals to non-hazardous forms for recycling.

Water is used as a vehicle for the transport of soluble metals in many industrial processes. For example, large quantities of water are employed in mining, metal refining, plastics manufacture, metal finishing of all kinds, washing of contaminated soils or industrial harbor bottom spoils, etc. Not only are many of the metals mobilized in these aqueous solutions hazardous, but some are also valuable as a recyclable commodity or precious metal. The water itself may also be valuable, if it can be recycled back to the original process and/or employed for other industrial purposes. Thus, metals recovery can be quite desirable for economic reasons.

Recovery of metals and the water transporting them for re-use is also desirable for the maintenance of environmental integrity. As is commonly known, copper, chrome, silver and other metals in a soluble form are hazardous, above certain concentrations, to health and the environment. These same metals in metallic (solid) form, however, do not present as great a health or environmental problem; for example, drinking water can be channeled through copper pipes, silverware is used to serve food, and food is prepared in stainless steel cookware containing chrome and other alloy metals without adverse health effects. Unlike organic materials, which can be broken down by oxidation, microbial degradation or other methods, to harmless elemental components (such as carbon and nitrogen), metals are generally present in an aqueous medium in a dissolved (ionic) elemental form. Toxic metals remain potential environmental hazards in soluble form. The metals should thus be converted, as part of their recovery from water or other waste streams, to a metallic form, in which state their toxicity or potential hazard is reduced to near zero upon recovery.

The most common treatment for removal of toxic metals from solutions is to increase the pH with lime or sodium hydroxide. The metals then precipitate as "insoluble" salts in a "sludge". The metal sludges, although of a lower volume that the initial waste liquid, are still very hazardous. A common disposal method for sludges has been to bury them in hazardous waste landfills; however, buried sludges remain a threat to groundwater. This burial method is thus being quickly eliminated as a viable option, as governmental policy and legislation proscribe it.

Other methods for metals removal from aqueous waste streams (including reverse osmosis and ion exchange in packed beds) are severely hampered or rendered inoperable by suspended solids in the aqueous waste stream, even when these solids are only present in small amounts. Accordingly, the waste stream must be filtered prior to treatment. This can prove economically impractical for many waste streams; moreover, such treatment results in the deposition of some of the contaminant metal in the removed particles on the filter medium, which itself then becomes a hazardous waste.

Most advantageous of all methods for the recycling of waste metals would be one in which the metal ions are captured, concentrated, and reduced to their metallic forms through chemical or electrical means. Such a method would not only remove and separate the metals (and, optionally, other contaminants) from the waste stream, but also concentrate and render them non-hazardous by converting toxic ions to metallic forms.

Accordingly, it is an object of the present invention to provide a method for removal of waste materials from liquids contaminated with those materials, and an apparatus for use in conjunction with such method, that will overcome the disadvantages of prior art treatment methods with respect to handling of removed waste materials.

It is a further object of the invention to provide a method and apparatus for removal of waste materials from liquids which operate continuously in a steady-state condition, when such operation is desirable.

It is yet another object of the invention to provide a method and apparatus for removal of metals (and, optionally, other contaminants) from waste streams which, after an initial startup, permits metal capture, concentration and recovery (for example, by electroreduction) to be carried out simultaneously and continuously.

SUMMARY OF THE INVENTION

The present invention relates to a device and method for treating process or wastewater streams containing contaminants, in particular dissolved metals. The device is generally self-contained and employs some type of waste recovery medium (for example, a cation and/or anion exchange medium or a chelating medium) to capture metals and/or other contaminants. Subsequently, the medium is reactivated by removal of the metal. The metal in the concentrate resulting from treatment of the medium may also advantageously be recovered, for example, by an electrowinning operation. The reactivated medium is then recycled to again capture contaminants in further wastewater to be treated.

The process has a wide range of applications, including wastewater purification, demineralization of drinking and industrial water (radioactive or nonradioactive), recovery of metal catalysts for reuse, decontamination of metals-contaminated soils and dredge spoils, demineralization of incinerator ash, removal of toxic metals from smoke scrubber water and sludge, pesticide recovery from groundwater, demineralization of municipal sewage sludges, and efficient removal and recovery of heavy metals (including precious metals) from mining process streams, tailings and industrial waste streams. Removal of metals or organic contaminants from soils, sludges, tailings or other solids generally requires a pre-treatment during which the contaminants or metals are brought into the aqueous phase before removal of the metals and/or other contaminants pursuant to the invention.

DETAILED DESCRIPTION OF THE INVENTION AND DESCRIPTION OF PREFERRED EMBODIMENTS

Figure 1:
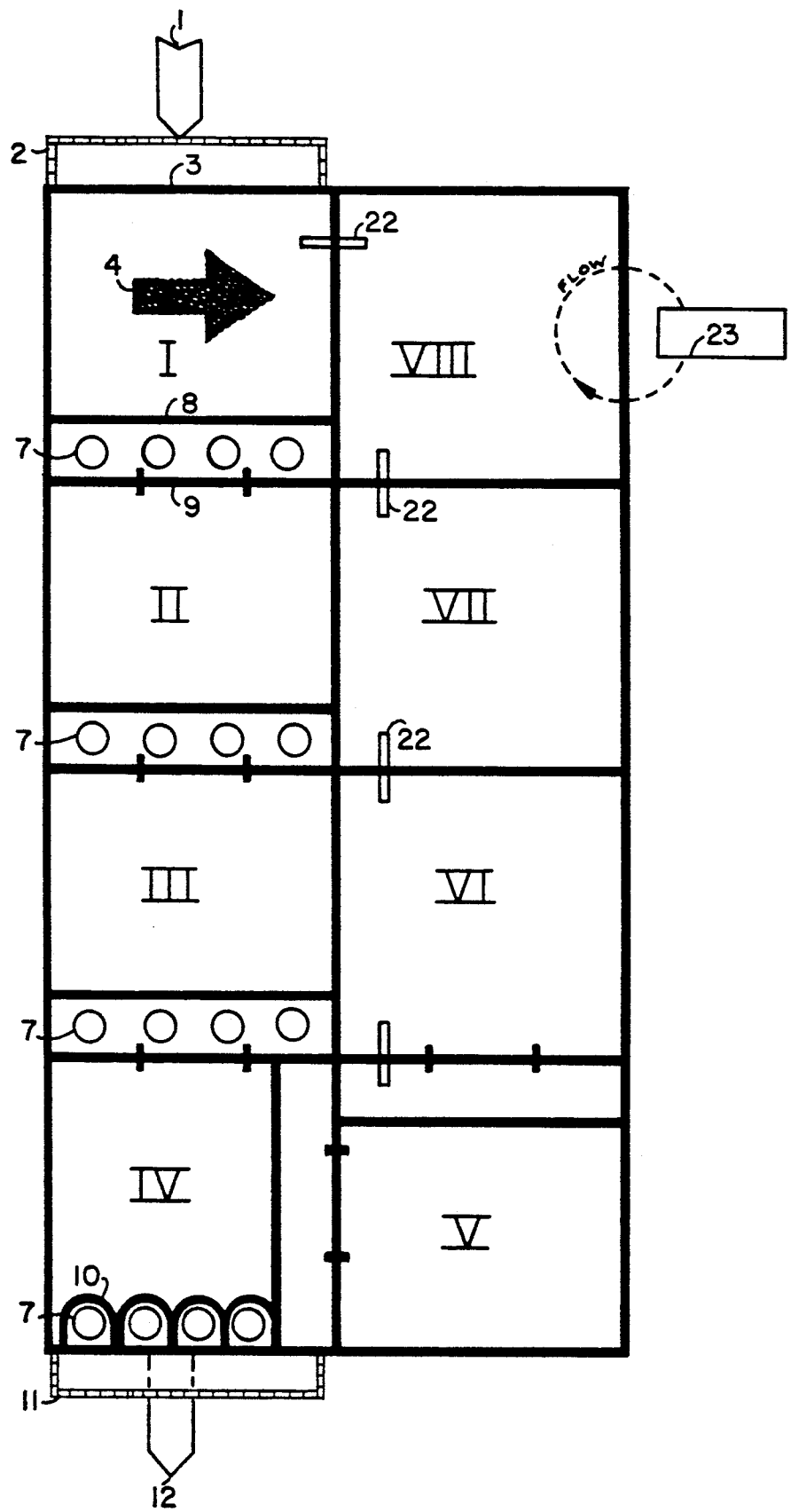
FIG. 1 illustrates an embodiment of the apparatus of the invention comprising eight containers, of which four are designated for waste recovery and four for media regeneration.

In accordance with one preferred embodiment of the invention, the apparatus comprises a series of interconnected containers. For purposes of discussion, the system is described with respect to a series of eight containers labelled I-VIII. Such a system is depicted in FIG. 1.

The wastewater stream flows through containers I-IV, with wastewater entering container I and subsequently passing through each of the containers I-IV, exiting the system from container IV. Each of the containers I-IV contains a contaminant removal medium, such as a cation and/or anion exchange medium or similar material, adapted to remove contaminants from the waste stream. The flow from one container to the next is regulated, for example, by weirs positioned between the containers. The highest concentration of contaminants occurs in the influent to container I. The greatest quantity of the contaminants is consequently removed from the waste stream by the medium in container I. Successively smaller quantities of contaminants are removed in subsequent containers II-IV; nonetheless, it is possible to maintain an equivalent relative removal efficiency (i.e. percent of contaminants entering a tank that are removed in that tank) in containers II-IV, even though the absolute quantity of contaminant removed in each of the subsequent containers decreases. Thus, if 90% of the contaminants are removed in container I, 90% of the remaining contaminants can be removed in container II, 90% of the remainder in container III, etc.

The contaminant removal medium is located in each of containers I-VIII. The medium is moved from container to container simultaneously in a clockwise direction, as indicated by the arcuate arrows. With respect to containers IV-I, the following sequence occurs; for purposes of simplicity, in this example use of a cation and/or anion exchange medium is described. Regenerate exchange medium (as explained later) from container V is transferred into container IV. The wastewater in container IV has a relatively low concentration of contaminants and the medium is at its full available capacity (i.e., most of the ion exchange sites are available for metal capture). Thus, the medium can remove most, if not all, of the contaminants remaining in the partially-treated wastewater at that stage. The medium is then passed (for example, via airlift) to container III. The remaining capacity of the medium is slightly decreased due to its use in treatment of the wastewater in container IV, but the concentration of contaminant is also higher in container III. Thus, the medium still functions well. Next, the exchange medium is passed into container II. Again, though the capacity of the medium is lower than it was in container III, the concentration of contaminants in container II is correspondingly higher, allowing the exchange medium to continue to remove contaminants at essentially the same relative efficiency. The exchange medium is then passed to container I, where the waste stream is at its highest contaminant concentration (of containers I-IV). Similarly, though the exchange medium entering container I is lower in capacity, it still maintains a high contaminant removal efficiency due to the higher concentration of contaminants.

After an appropriate residence time in containers I-IV, the exchange medium is effectively loaded, i.e. nearly all of the exchange/capture sites are occupied. At this point, it is necessary either to replace or, preferably, to regenerate the exchange medium. Accordingly, in a preferred embodiment including medium regeneration, the exchange medium from container I is transferred, for example by airlift means, into container VIII. Container VIII contains a reagent (generally, an acidic salt solution) that causes the contaminants to be released from the exchange medium and pass into solution. For example, when the exchange medium is used to remove metals from a waste stream, container VIII contains an acidic aqueous solution of, e.g., sodium sulfate which causes the metal ions on the medium to go into solution, as the sodium and hydrogen ions in the regenerant solution replace the metal ions on the medium. Consequently, the concentration of metal ions in container VIII becomes high. The metal ions can at this point advantageously be removed from solution, for example, by an electrowinning process. Due to the high concentration of metal ions in container VIII, the electrowinning process can operate with a relatively high current efficiency.

The exchange medium is subsequently moved (for example, again by airlift means) into containers VII, VI, and V, sequentially. Containers VII and VI also suitably contain a solution for further reactivating the exchange medium, whereas container V may be filled with rinse water. By the time the exchange medium reaches container V, it is essentially fully reactivated and capable of being transferred into container IV for reuse in removing contaminants from the waste stream.

Containers VII-VI serve to reactivate the exchange medium by causing the contaminants associated therewith to go into solution. Fresh reactivating solution (acidic sodium sulfate, for example) is introduced into container VI. The exchange medium contained in container VI is generally substantially or fully reactivated and the amount of contaminant released in container VI is typically relatively small as most of the contaminants are released in containers VIII and VII. The reactivating solution then flows into container VII, which contains exchange medium having a higher level of retained contaminants. The reactivating solution flows from VII into container VIII, which contains exchange medium having a still higher level of retained contaminants. In this manner, the sodium concentration in the reactivating solution (and hence its medium regeneration ability) decreases as it passes from container VI to container VII to container VIII. Conversely, the contaminant concentration in the reactivating solution increases. When the reactivation solution reaches container VIII, its sodium concentration is lowest, and the level of contaminants contained in the same solution is highest (generally, approximately 70-90% of the retained contaminants).

The reactivation solution in container VIII is advantageously slowly bled into container I so as to maintain roughly the same volumes in containers V-VIII, while at the same time the solution is constantly replenished with regenerant. The quantity of liquid passing through containers I–IV is much greater than the amount of liquid flowing in the reverse direction through containers V–VIII. The amount of liquid passing from container VIII to container I is thus generally small in comparison to the amount of liquid passing through containers I–IV. Therefore, no ill effects are caused by the contaminants reintroduced into container I from VIII.

A distinct advantage which derives from the method of medium counterflow is that the medium itself need not have exceptionally high affinity for the contaminant(s) to be removed. A case in point is given in Example 2 in which iron and other metals must be removed from a simulated boiler cleaning solution that is in the pH range of 0.5 to 1.5. Cation exchangers at such pH values do not remove metals efficiently in fixed bed systems or in conventional fluidized beds wherein one or two stage systems are used; the protons (H+) in high concentration in the solution compete with metal ions for the available sites on the ion exchanger. As a consequence, an equilibrium will rapidly develop, manifested by a low metal capture of, for instance, 60–70% of the metal in solution. If, however, the thus-treated solution with a residual 30% of the metal is separated from the medium and admixed with unused medium (or one used previously only for treatment of materials with lower concentrations of metals, as is the case in medium counterflow as described herein) the residual metals in the solution will once again arrive at a point of equilibrium in which 60–70% of the remaining metals in the residual 30% will be found associated with the ion exchanger. If this process is repeated, the contaminating metals can be progressively reduced until they are undetectable.

The same general type of process may also be used to remove hazardous organics from water. The process of the invention is especially useful where particular media, such as imbibing beads, may have a low absorbing coefficient (K) for an organic molecule:

$$K = \left[ \frac{\text{in the bead}}{\text{outside the bead}} \right].$$

The combination of medium counterflow and multiple treatment stages effectively compensates for the low absorbing coefficient.

In accordance with the above discussion, the inventive method and apparatus have been found particularly useful in removing dissolved metals from water. In a further embodiment of the invention, other contaminants are also removed from the solution instead of, or preferably simultaneously with, the removal of dissolved metals. For example, through a proper choice of media, it is possible to remove organic contaminants while still recovering metals and recycling the metals recovery medium in a continuous manner.

This invention incorporates all steps required to capture metals continuously and purify industrial wastewater, sludge extracts, etc., making the recycling of both water and metals a practical feature of the invention. Furthermore, the invention can utilize any appropriate particulate medium suitable for the removal of contaminants from aqueous solutions (e.g. ion exchangers, activated carbon, chelating compositions, imbibing beads, etc.).

Preferred embodiments of the invention may incorporate one or more additional features which can serve to improve efficiency of operation and economics of use:

1. Continuous treatment of wastewater may be carried out without the need to divert or interrupt the treatment to reactivate the medium.

2. Removal of metals from the medium (so that the medium may be reused) may be carried out continuously, separate from, and in parallel with, the treatment of a waste stream.

3. Metals may be removed effectively from waste streams containing a wide range of metal concentrations (i.e., 1 part per million (ppm) or less to thousands of ppm), and from waste streams containing fluctuating concentrations of metals over time.

4. Captured metals may be converted simultaneously and continuously from toxic ionic forms to non-hazardous metallic forms through electroreduction or other recovery procedures, as an easily integrated feature of the system.

5. Reagents used to recycle the medium may serve several functions; they may be used to remove metals from the medium to high concentrations (ionic metals), perform as an electrolyte for the electroreduction of the metals to metallic form, and serve as a rinse solution for reconditioned medium.

6. The entire system may be designed so that it will inherently achieve a steady-state. Metals removal from wastewater by the medium, the removal of metals from the medium, the electroreduction of metals from ionic to metallic forms, the consumption of reagents, and the recycling of the medium can all be controlled simultaneously, at individual rates appropriate for the integration of all the processes.

7. The process may preferably be carried out in non-pressurized, fluid bed tanks. In this manner, particulate matter in the influent does not disturb the metals removal process, clog the medium, or restrict the wastewater treatment flow, as is generally true with packed-bed devices, provided that any suspended particles are smaller than the particles of the medium.

8. Because of the steady-state feature of the process, the response of the system to incoming, metals-laden waste is predictable and can be expressed arithmetically.

The concentration of the medium in the waste stream (e.g., containers I–IV) will determine the velocity of the removal of metals from the wastewater as it passes through the system. For instance, generally the velocity of metals removal from the wastewater containing 20% (volume/volume) medium will be twice that of wastewater containing 10% medium. Moreover, if the medium concentration is 5%, the rate of removal of metals will be one-half that at 10%, etc.

As the rate of metals removal from the waste water is generally proportional to the medium concentration (i.e., the rate of metals removal may be increased by increasing the medium concentration), then it stands to reason that one may also double the flow rate of the waste stream while doubling the medium concentration, as the flow rate of the waste stream determines the amount of metals entering the system over time. Therefore, the system will process increased influent rates of waste metals if the medium concentration is increased proportionately.

Another factor affecting the rate of metals removal from the waste stream as it passes through the system is the number of available sites on the medium for interaction with metal ions. Such sites can be increased merely by adding additional medium, as described above; however, one may achieve the same result (i.e., increase the velocity of metal removal from the waste stream) by increasing the rate of medium transfer in the counterflow direction. If one doubles the rate of medium transferred, in general, one increases by a factor of two the rate of metals removal. Moreover, if one doubles the medium transfer rate and doubles the concentration of the medium simultaneously, the velocity of metals removal from the wastewater will quadruple, provided all other factors are held constant. Therefore, doubling the medium concentration and doubling the medium transfer rate will permit an increase in the waste stream flow rate by four-fold.

There are limits beyond which increasing the waste stream flow and the medium transfer rate are not practical. In the case of medium concentration, about 50% volume/volume is an effective maximum while about 0.5% is a practical minimum. The waste stream flow rate can only be increased to the point at which the water can no longer freely flow through the system (e.g., it encounters constriction by retainer tube screens at the exit of each container in a preferred embodiment). This flow rate may also be affected by the nature of the medium, which will have a greater tendency to accumulate on the screens as the flow rate of the wastewater is increased. This problem can be substantially alleviated, for example, by inserting air tubes into each tubular screen and periodically introducing a pulse of air, which clears the exterior screen surface of accumulated medium.

If the waste stream has a relatively low pH (i.e. $<1.5$), then protons ($H+$) in the waste stream can compete for available sites on the medium (as mentioned above). In such a case, increasing the medium concentration may not necessarily result in a strictly proportionate increase in the rate of metals uptake by the medium. Accordingly, the pH of the waste stream is also a factor which should be taken into consideration when adjusting the operating parameters for a given waste stream, especially when very acidic materials are involved.

When one has an increased concentration of metals, for instance twice the concentration, one may slow the influent into the system by one-half and the remaining system parameters need not necessarily be changed. If, on the other hand, one must maintain the influent flow rate, even though the metal concentration has increased, one may increase the medium concentration and/or the medium transfer rate to adapt to the new metals concentrations. The rate of metals release on the medium regeneration side of the system is generally sufficiently rapid that it does not become a rate-limiting factor in the process. Moreover, the electroreduction is only rate limited by the cathode/anode surface area, surface voltage potential, and current density; usually, each of these parameters may be readily adjusted so as to permit electroreduction of metals at a rate equal to incoming metals in the wastewater. Further, all such factors generally may be adjusted automatically by use of known means (such as sensors for metal concentration, reagent concentration, pH, etc.) where suitable for greater ease of operation.

In its most preferred embodiments, the system comprises in general two integrated moieties, each using a portion of the system tanks: a contaminant capture (wastewater treatment) phase and a medium recycling phase. There may be instances where the volumes of wastewater to be treated require such large flow rates through the process that the contaminants contained therein (especially in the case of metals) cannot be removed completely in four tanks, as employed in the exemplary embodiment previously described. The system can then be modified to 5 or 6 tanks for contaminant capture, while maintaining four reconditioning tanks for recycling the medium. Alternatively, the system can be arranged for 5 or 6 tank contaminant capture with an equal increase in the number of regenerant-rinse tanks. The latter alternative is particularly useful when the influent to the system contains high metal concentrations, for example 1200 ppm or more, and additional treatment tanks would be required to reduce metal concentrations below acceptable levels.

For purposes of illustration, in a system for metals removal where each tank is 1 $m^3$, for instance, the flow rate for incoming metals-laden wastewater may be as low as 1 $m^3$ per hour or less, or as high as 1 $m^3$ per 2.5 minutes. As the waste stream passes through the treatment tanks, the amount of medium used is adjusted to remove metals to below desired concentrations. The range of medium volume, in proportion to wastewater volume (in the tank), may be from 0.5% to 50%, depending on the flow rate of the waste stream and the concentration of the metals which it contains.

Medium may be moved continuously, or at timed intervals, from one tank to the next, in a direction opposite to the flow of wastewater. The same amount of medium is generally moved from each tank, so that all tanks continue with the same medium concentration. A complete tank medium load may be moved into the next tank in as little time as 15 minutes, or as long as a day or two, depending upon contaminant concentration and flow rate of the influent stream to be treated. The medium may be transferred from tank to tank by airlift systems, helicoidal transmission, pneumatic jets, or other types of separating pump. The medium may be transferred with its associated liquid into a neighboring tank, or it may be transferred after separation from the liquid. In the latter instance, the liquid remains in the tank of origin, whereas the medium moves into the next tank.

The counterflow movement of the medium is designed so that the freshly regenerated medium enters the last container of the waste treatment stream, where contaminant levels are lowest and the medium is in an optimum condition for removing contaminants. As the medium is moved countercurrent to the direction of liquid flow, higher concentrations of contaminants are progressively encountered until the medium reaches container I. There, the highest contaminant concentrations are encountered and the medium's contaminant load is the greatest.

As previously noted, this contaminant-laden medium in a preferred embodiment of the method is then transferred into container VIII, where it is suspended in a solution which may advantageously be designed to perform two functions. First, the solution causes the rapid release of the majority of the contaminant (most suitably, metals) from the medium into the solution. This may be accomplished by various means. For example, in the case of metals recovery medium, there may be an exchange of ions (e.g. $Na^+$ or $H^+$ for $Fe^{2+}$). Alternatively, a solution may be employed that may simultaneously change the valence of a chelated metal and reduce the chelation moiety on the medium (for example, reduction of $Fe^{3+}$ to $Fe^{2+}$ on a ferric ion chelator by Na$_2$S$_2$O$_4$, resulting in the release of Fe$^{2+}$ into solution). Second, the regenerant solution also may serve as an electrolyte formulation for electroreduction of metals. The electroreduction may be carried out directly in container VIII, or in an adjacent tank with constant circulation between that tank and container VIII.

The electroreduction can remove metals from the solution at a rate identical to the waste stream metals input into Tank I—a rate also identical to the metals input from Tank I to Tank VIII via the medium. A constant concentration of soluble metal in container VIII can be maintained to provide optimum electroreduction and to minimize dragover as the medium is transferred to container VII for further reactivation.

The movement of the medium in counterflow to the waste stream may be carried out by any number of means which would be readily apparent to any one familiar with techniques for relative movement of solids and liquids. For example, the water and its suspended medium may be lifted above water level in the container, such as by the introduction of air into the bottom of a pipe set into the water-medium suspension. Air bubbles introduced in this manner cause the water and medium to travel upward. Water and medium both may be transferred together into the adjacent container, or they may be transferred into medium/liquid separation means (such as a box which separates the medium from the water using, e.g., a slotted screen through which the water flows). The water thus separated is directed back to the container from which it came and the semi-dry medium is delivered into the adjacent container. The latter method is used to prevent the cross-contamination of tanks containing solutions of different reagent compositions, such as containers I and VIII in the illustrated embodiment, and to reduce metal dragover between regenerant tanks.

Counterflow medium transfer may also be carried out by drawing the water and suspended medium into a tube of an appropriate size with a medium-exclusion screen on the bottom. A pump draws the water with the medium from the container into the tube. The screen allows the passage of water, resulting in the tube filling up only with the medium. The water then returns to its originating container. The medium in the tube may then be expelled into the adjacent container, using means such as water injection from the adjacent container, an air pulse, a mechanical piston, or any other suitable device to complete the transfer of the medium (less the water) from one container to the adjacent container. A similar transfer can be carried out by means of medium exclusion screens, as in the form of buckets moved through the suspended medium by chains and translocated, less the water, up and out of the medium to a second tank where the medium is dumped from the bucket. The bucket then continues on a chain back into the first container, where it once again picks up medium less water for transfer to the adjacent tank.

In a preferred embodiment, city water is used as a rinse solution and enters the final rinse tank for the reconditioned medium (container V in the described embodiment), at a rate normally around 1 to 2 tank changes per day. This range may be shortened to meet the needs of container VIII, as described below. The overflow from the final rinse (container V) may be fed by gravity or a metering pump to a side tank containing a saturated solution of the regenerant salt. Water introduced into the saturated brine tank will cause more salt to dissolve from the tank bottom, and the saturated solution will overflow into container VI. The advantage in the use of saturated brine is that the operator need not perform any precise measurements to make up the regenerant solution, but need only insure that there is solid salt in the bottom of the brine tank. This may be accomplished by the occasional additional of solid salt. Alternatively, one may add salts as solids into the appropriate tanks manually or by means of, e.g., metering devices.

Concentrated acid or base is metered into the appropriate containers by means of, e.g., a peristaltic (or equivalent) pump at a slow rate or periodically in response to, e.g., an automatic pH titrator to render the solution any appropriate pH. The salt solution may be Na$_2$SO$_4$, or other reagent, and the acid H$_2$SO$_4$, or other acid; the reagents may be in any suitable concentrations. The only requirements are that metal be removed from the medium and that (when appropriate) the solution may serve as an electrolyte for electroreduction.

A constant flow of city water and acidic salt solution serves several functions. It replaces reagent protons (H$^+$) and sodium (Na$^+$) ions taken out of solution by the medium, if it is a cation exchanger, or sulfate (SO$_4^-$) if it is an anion exchanger. Ion exchangers are not, of course, the only possible medium. The medium can be any substance that will bind and release metal and/or other contaminants and function in the overall system which constitutes this invention. The flow of city water and acidic salt solution would also serve to rinse the medium and prevent it from binding any heavy metals that drag over into container VII upon the transfer of medium from container VIII to VII. The city water in container V or the treated, metals-free waste effluent can each serve as a rinse water to remove excess salt and acid that may drag over with the medium upon its transfer from the reconditioning tank. The constant slow flow further serves as a self-cleaning mechanism. The small amount of metal which dumps into Tank I from Tank VIII is immediately taken up by the medium.

The system is flexible so that more tanks may be added to either module (treatment and/or media recycling). The tanks may be square, round, or other shapes. Any number of tanks may be used for treatment or regeneration of the medium, in several different permutations. The number used, and their permutations, may depend on the following:

1. Type and concentration of contaminant(s), such as metals, in the influent stream;

2. Type and strength of contaminant removal mechanism, such as chelating or complexing of metals;

3. Type of medium used;

4. Type of contaminant-dumping reagents used to remove contaminants from the medium;

5. pH and presence of competitive ions in the influent wastewater (most particularly in systems for metals removal and recovery); and 6. Influent flow rate.

In preferred embodiments of the invention, each tank is constantly agitated. The means employed in a particular system to agitate the tank contents may be any of a wide variety of means, such as direct stirring (e.g., impellers), air bubbles, jet pump (e.g., a Jacuzzi ™ pump) or other suitable devices.

A better understanding of the invention may be provided by the following description of preferred embodiments of various aspects of the inventive apparatus and method, such as are depicted in FIGS. 1-5. While this description indicates particularly suitable selections of elements from among available alternatives, it should be understood that means other than those specifically described below solely for purposes of illustration may, with respect to any given element in any given instance, be equally or better suited for use in accordance with the invention. As will be readily apparent to any worker in the field, moreover, preferred embodiments as described in FIGS. 1-5 and the accompanying text reflect choices made by particular individuals in a specific context. Thus, without departing from the spirit and scope of the present invention, it would be possible to select different combinations of elements in any given context.

Figure 2:
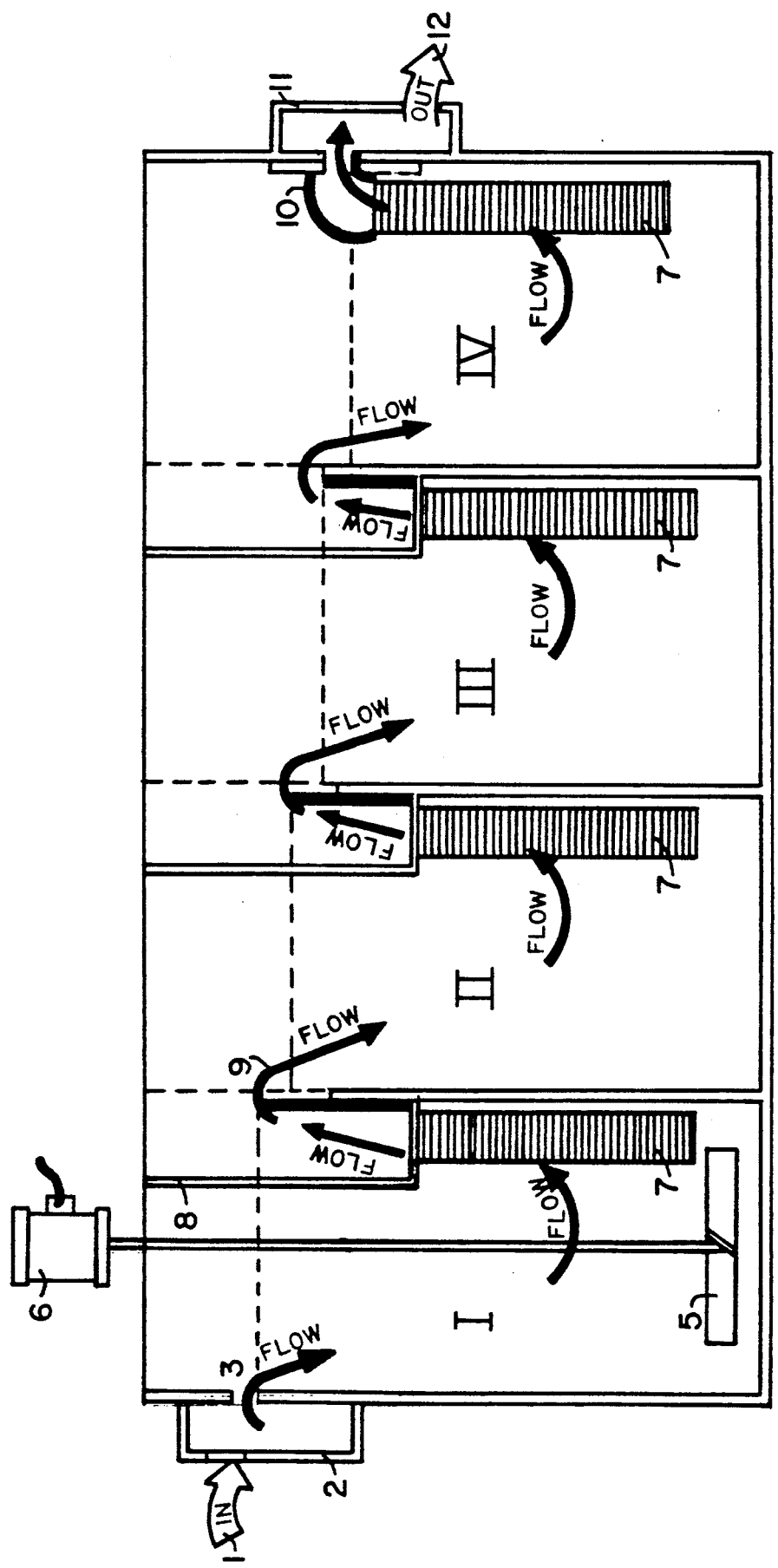
FIG. 2 is a vertical cross-section of Containers I–IV of the embodiment of FIG. 1.

With reference to FIGS. 1 and 2, untreated wastewater 1 enters the inlet collector box 2, which it fills upwards until the wastewater cascades through the slot 3 into Tank I. This tank is the first in a series of identical tanks, the number of which depends on the process requirements based on inlet and outlet parameters for contaminant (e.g., metals) removal. In Tank I, the untreated wastewater is brought into mixing contact with the medium 4 which is agitated upwards to meet the inlet water by a propeller 5 designated to give upthrust to the medium and associated liquid without causing any attrition of the medium 4. Typically, an electric motor 6 can be used to rotate the propeller 5 (as illustrated in FIG. 3).

Figure 3:
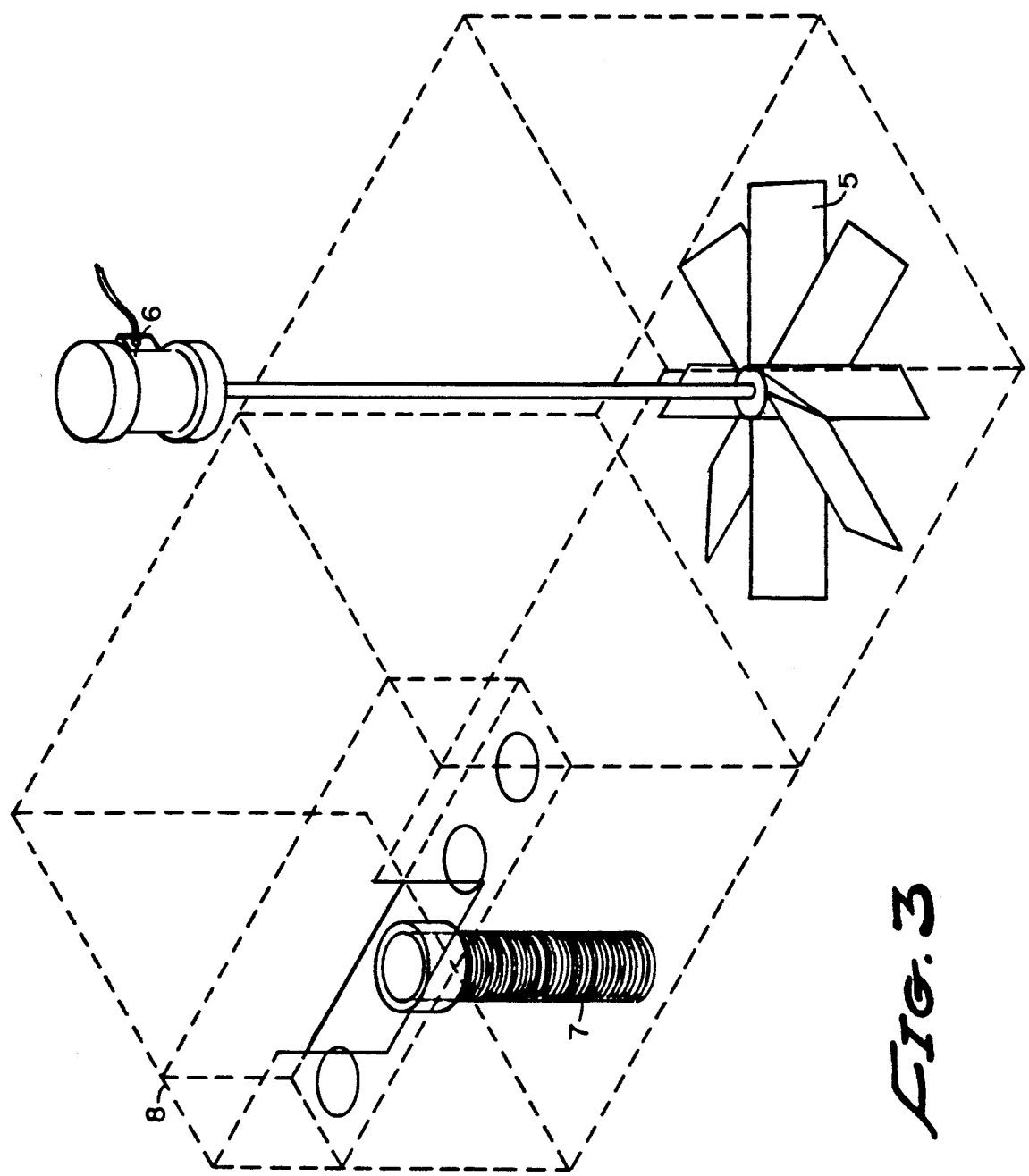
FIG. 3 is an illustration of preferred embodiments of tank inlet means and agitation means according to the invention.

From Tank I, the wastewater which has been treated to the maximum capacity of the medium in this tank flows through a group of (intertank) slotted tubular screens 7 into a weir box 8 (as illustrated in FIG. 3) and flows over a weir 9 into Tank II. This tank and subsequent identical tanks follow the same flow pattern as in FIG. 2 up to the group of slotted tubular screens 7 of Tank IV through an outlet elbow 10, which directs the treated water into an outlet collector box 11. Treated water 12 can be evacuated to any required point for recirculation or disposal according to the specific process needs. The outlet collector box 11 is obviously not limited to any specific position on Tank IV; it could be positioned (depending on the process parameters) on Tank V, Tank VI or even beyond. The configuration as shown for the outlet of treated water 12 from Tank IV is also non-limitative, as already clarified, thereby further adding to the flexibility of apparatus and process characteristics to meet varying application parameters.

Figure 4:
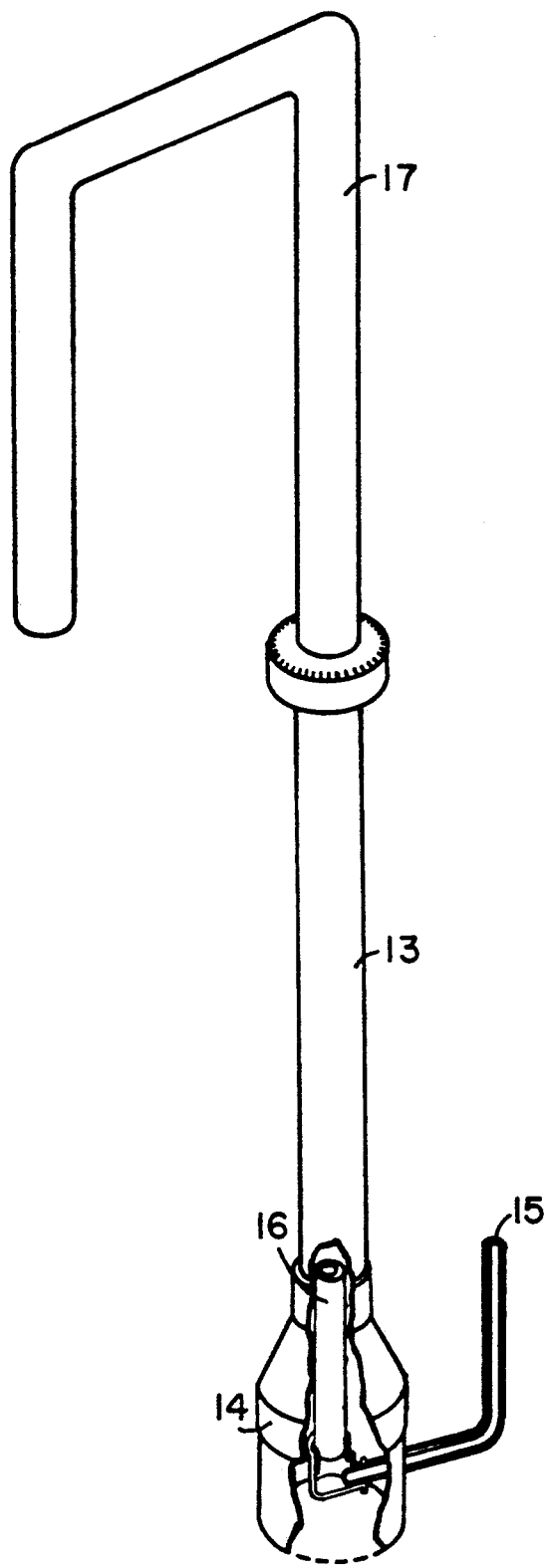
FIG. 4 depicts a preferred means for intertank media transfer according to the invention.
Figure 5:
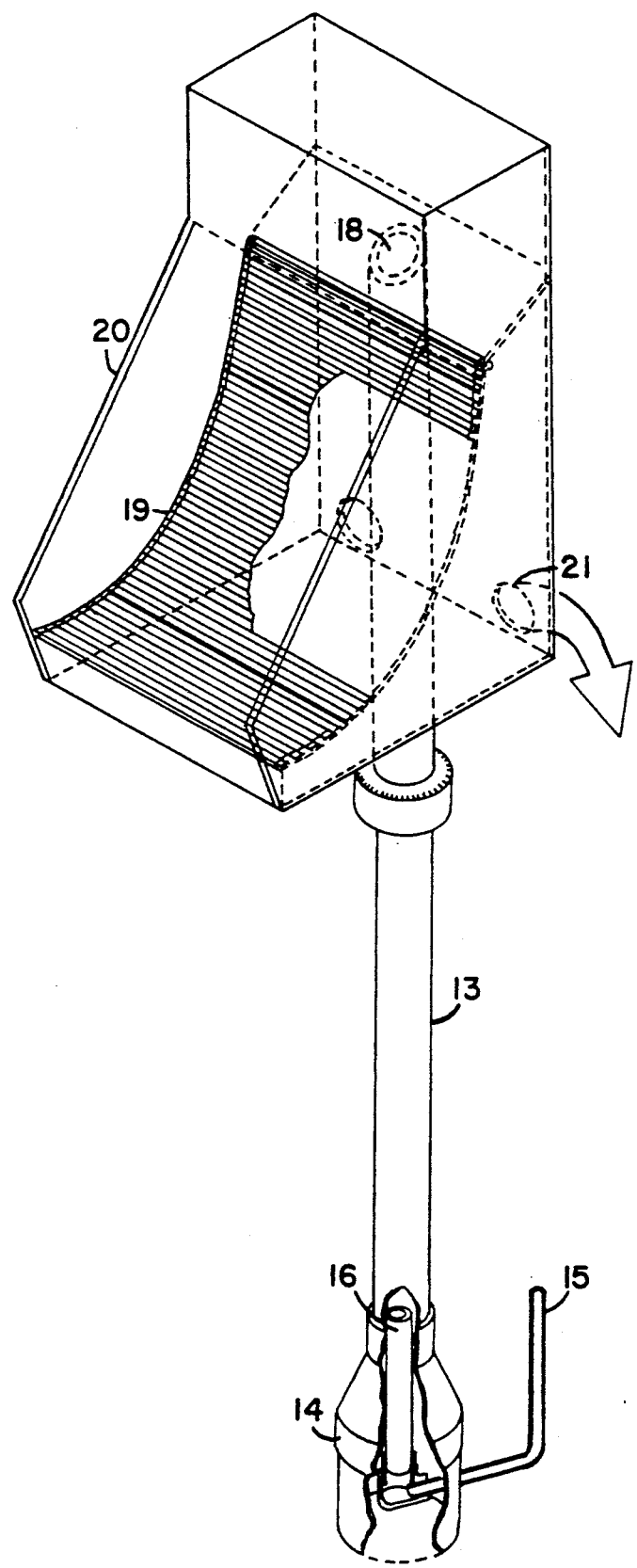
FIG. 5 illustrates a preferred embodiment of media/liquid separation means in conjunction with intertank media transfer means.

The movement of medium 4 is in a clockwise direction to the counter-clockwise flow of the water to be treated. This is shown typically for a four tank treatment system in FIG. 2 in plan view. The medium and associated liquid is lifted by a mechanism, such as illustrated in FIGS. 4 and 5. This mechanism comprises a standpipe 13 and a bottom bell housing 14. Within the bell housing 14 which holds the medium in suspension in essentially the same consistency as in the tank, the level of the medium in suspension in the standpipe is also generally the same as in the tank until such time as transfer of the medium from one tank to another is desired. At that time, compressed air is introduced into the conduit 15 and through an ejector assembly 16, causing a suitable force to lift the medium and associated liquid in suspension to the top of the gooseneck 17 (for direct air lift systems as illustrated in FIG. 4) or to the top of the standpipe 18 of the media separation box 19 (for media separation systems such as illustrated in FIG. 5). In the case of direct air lift (where indicated) the medium is transferred in suspension with water in a clockwise configuration (as shown in FIG. 2). In the case of media separation (where indicated) the medium is separated by means of the slotted curved screen 19 of the media separation box 20 (as depicted in FIG. 5). Water drains through the slots in the curved screen and returns through the orifices 21 in the tack of the media separation box to the same tank from which the medium was lifted. The medium, however, slides forward on the slotted curved screen configuration (as shown in FIG. 5).

From the last tank (shown in FIG. 1 as Tank VIII, but not limitative), the rinse liquid can be further tapped to any other process such as electrowinning to further concentrate the metals and recover them in a usable form. One such separate metals recovery means 23 is generally illustrated in FIG. 1 as in flow connection with Tank VIII for the described, non-limitative embodiment. Reagents, for example saturated sodium sulfate solution, for the reactivation of the medium can be added to, e.g., Tank VI of the illustrated embodiment. Reagent addition can be performed by any suitable means, such as diaphragm metering pump. Liquid level in Tank VI is maintained as reagent addition forces excess liquid through a backflow conduit 22 into Tank VII. Similarly, the liquid entering Tank VII causes excess liquid to flow through another backflow conduit into Tank VIII, and from Tank VIII into Tank I. Water can be added to Tank V as a final rinse of the reactivated medium. Again, a backflow conduit 22 maintains a constant liquid level in the tank, allowing excess liquid to flow into Tank VI.

The location of the backflow conduits 22 are such that the liquid level in Tank V is higher than the liquid level in Tank VI, higher in Tank VI than Tank VII, Tank VII higher than Tank VIII, and Tank VIII higher than Tank I. In this way liquid is prevented from travelling in the wrong direction (i.e., Tank I to Tank VIII, Tank VIII to Tank VII, etc.). For example, in an exemplary system liquid depth may be: Tank I=37 in., Tank VIII=38 in., Tank VII=39 in., Tank VI=40 in., Tank V=41 in.

The backflow conduit may be a short piece of straight pipe installed in the tank wall with adjustable elbows on either end. Pieces of straight pipe of various lengths may be attached to the elbows. By swiveling the elbows with attached straight sections to different angles, a height differential between liquid in adjacent tanks can be created. A mesh screen can be installed in the input end of the conduit to prohibit medium transfer.

Depending on the particular contaminant(s) to be removed, a wide variety of types of contaminant removal medium is available. In particular, a broad spectrum of metal absorbing media may be used separately, or in some instances in combination. In instances where cation exchangers will remove the metals from water, cation exchangers in an appropriate form (e.g. $Na^+$ or $H^+$) are used. They are chosen for their ability to accomplish the designated task and for their suitability in special environments, with due consideration of properties such as resistance to attrition by abrasion, resistance to osmotic shock, porosity, degree of polymer cross-linking, etc. Suitable anionic exchangers may be selected on the basis of similar considerations. Examples of commercially-available, general use ion exchangers which may be employed according to the invention are as follows:

Anion Exchange Resins

Purolite A-600, A-400, A-300, A-300E, A-850, A-500, A-510, A-500P, A-100, A-103, A-104, A-110, A-444, NRW-600; Rohm & Haas IRA-400, IRA-402, IRA-410, IRA-458, IRA-900, IRA-910, IRA-904, IRA-93/94, IRA-47, IRA-78; Dow SBR, SBR-P, SAR, MSA-1, MSA-2, MWA-1, 66, WGR-2/WGR, Dowex II; Ionac ASB-1, ASB-1P/A-540, ASB-2/A-550, A-641, A-651, A-642, AFP-329, NA-38; and Duolite A109, A-101D, A-102D/A-104, A-132, A-161, A-162, A-378, A-368, A-340, ARA-366.

Cation Exchange Resins

Purolite C-100(Na), C-100H Black, C-100 X 10, C-150, C-155, C-160, C-105, C-106, NRW-100; Rohm & Haas IR-120/130, IR-122/IR-132, IR-200, IRC-84, IRC-50, IRC-77; Dow HCR-S/HCR-W2, HGR/HGR-W2, MSC-1, CCR-2; Ionac C-249/C-298, C267, C-250/C-299, CFP-110, CC, CNN, NC-10; and Duolite C-20/C-225, C-20 X 10/C-225 X 10, C-26, C-433.

Mixed Bed Resins

Purolite NRW-37; Rohm & Haas IRN-150; Dow MR-3; Ionac NM-60; and Duolite ARM-381.

In addition, mixed media may be employed for simultaneous removal of metals and, for example, organics, from waste liquids. Therefore, while reference is generally made to a medium, it is fully within the scope of this invention to employ mixtures of media for removal of more than one contaminant at a time and/or to facilitate removal of a particular contaminant from the solutions.

The following examples are illustrative of various aspects of the invention, but are not to be construed as in any sense limiting thereof.

EXAMPLE 1

Copper Removal and Electroreduction Using a Steady-State System Lab Model

To evaluate the effectiveness of a laboratory-scale, multi-tank, steady-state system to remove copper from approximately 100 parts/million (ppm) copper influent, the following experiment was carried out.

The lab model comprised eight 3-liter tanks. 250 ml Purolite C-100 Cation Exchanger was placed into each of the eight tanks of the laboratory-scale steady-state system. Tanks I, II, III, IV, and V were filled with tap water to a total volume of approximately 2.5 L, producing 10% media suspensions by volume. Tanks VI, VII, and VIII were filled with 1.0 Molar (M) $Na_2SO_4$ (sodium sulfate) in 0.2 Normal (N) $H_2SO_4$ (sulfuric acid) Two stainless steel cathodes, 5"×5", and two lead anodes, 5"×5", were installed in Tank VIII. Each tank was stirred with impellers.

A 91 ppm copper solution was prepared by diluting MacDermid ™ plating solution of $CuSO_4$ (copper sulfate) with deionized water. This solution was pumped into Tank I at a rate of 255 ml/min (367 L/day). The electroreduction was carried out with 5 A, at 3.0 V per cathode plate.

Cation exchange resin (C-100 Purolite, Hydrogen) was transferred between adjacent tanks in a countercurrent direction at the rate of 30 ml every 30 minutes (approximately 1 tank change every 4 hours). A 25 ml portion of 1.0 M sodium sulfate in 0.2 N sulfuric acid was added to Tank VI every 60 minutes. A 25 ml portion was then transferred from Tank VI to Tank VII, from VII to VIII, and from VIII to I. Samples were first taken from Tanks I to IV, inclusive, at indicated intervals of time, after which samples were taken from all eight tanks at every interval. All samples were analyzed for copper concentration on the Thermo-Jarrell-Ash Inductively-Coupled Plasma Emission Spectrometer (ICP). Results are shown in Table I.

TABLE 1

Results of a Continuous-Operation Laboratory Pilot Plant Test of the Steady-State System

| Elapsed Time (Minutes) 91 ppm Cu input sln. | Copper Concentration (Parts per Million) TANKS | | | | | | | |
|---|---|---|---|---|---|---|---|---|
| | I | II | III | IV | V | VI | VII | VIII |
| 0 | 0.0 | 0.0 | 0.0 | 0.0 | | | | |
| 5 | 5.2 | 0.31 | 0.05 | 0.01 | | | | |
| 10 | 6.6 | 0.52 | 0.17 | 0.04 | | | | |
| 15 | 7.1 | 0.34 | 0.13 | 0.06 | | | | |
| 20 | 7.0 | 0.31 | 0.07 | 0.04 | | | | |
| 25 | 7.4 | 0.48 | 0.05 | 0.05 | | | | |
| 30* | 7.6 | 0.54 | 0.07 | 0.05 | | | | |
| 45 | 7.5 | 0.71 | 0.23 | 0.13 | 0.28 | 2.3 | 4.7 | 240 |
| 75 | 10 | 0.95 | 0.11 | 0.13 | 0.64 | 0.94 | 9.1 | 150 |
| 105 | 8.3 | 0.91 | 0.04 | 0.05 | 0.03 | 1.67 | 15 | 91 |
| 135 | 9.1 | 0.72 | 0.05 | 0.03 | 0.08 | 2.6 | 25 | 110 |
| 150 | | | | | | | | 88 |
| 165 | 5.7 | 0.59 | 0.08 | 0.05 | 1.5 | 3.4 | 26 | 140 |
| 195 | 8.8 | 0.67 | 0.06 | 0.09 | 0.31 | 4.1 | 29 | 160 |
| 225 | 6.7 | 0.64 | 0.14 | 0.18 | 0.53 | 4.7 | 35 | 170 |
| 255 | 8.4 | 0.50 | 0.03 | 0.02 | 0.46 | 4.8 | 38 | 180 |
| 285 | 6.5 | 0.39 | 0.15 | 0.04 | 0.48 | 4.7 | 42 | 190 |
| 315 | 8.2 | 0.42 | 0.03 | 0.03 | 0.23 | 6.4 | 41 | 180 |
| 345 | 5.0 | 0.22 | 0.03 | 0.04 | 0.78 | 6.9 | 43 | 180 |
| 375 | 7.0 | 0.31 | 0.03 | 0.04 | 0.38 | 6.9 | 43 | 180 |
| 415 | 3.5 | 0.15 | 0.02 | 0.01 | 0.21 | 7.2 | 43 | 180 |
| 445 | 6.8 | 0.19 | 0.01 | 0.02 | 0.62 | 7.8 | 44 | 220 |
| 475 | 3.8 | 0.15 | 0.01 | 0.06 | 0.57 | 9.6 | 49 | 200 |

*Start electrowinning.

EXAMPLE 2

Iron and Other Metal Removal and Electroreduction from Simulated Boiler Cooling Tube Waste Water To evaluate the effectiveness of the steady-state system to remove iron and other metals from approximately 1200 parts/million (ppm) iron simulated acid cleaning water from the cooling tubes of an electrical utility power plant, the following experiment was carried out using the laboratory model of Example 1.

The wastewater had the following characteristics: pH 1.5; Fe 1200 ppm, Cu 20 ppm, Mn 10 ppm, Zn 5 ppm, Cr 10 ppm, Pb 1.2 ppm, Ni 5 ppm.

900 ml Purolite C-100 Cation Exchanger (H+form) was placed into each of the eight tanks of the laboratory pilot steady-state system. Tanks I, II, III, IV and V were filled with tap water to a total volume of approximately 3.0 L, producing 30% media suspensions by volume. Tanks VI, VII, and VIII were filled with 1.0 Molar $Na_2SO_4$ in 0.2 Normal $H_2SO_4$.

Five soft steel cathodes, 5"×5", and 5 platinized titanium anodes, 5"×5", were installed in an auxiliary 3 liter tank connected and continuously recirculated to Tank VIII. Each tank was stirred with an impeller.

A 1200 ppm iron solution was prepared to correspond to the boiler tube cleaning waste of a utility. This solution was pumped into Tank I at a rate of 270 ml/min (388 L/Day). The electroreduction was carried out with 10 A, at 5.0 V per cathode plate. Cation exchange resin (C-100 Purolite, H+form) was transferred between the tanks at the rate of 450 ml every 30 minutes (1 tank change every 1 hr.). 1.0 M sodium sulfate—0.2

N $H_2SO_4$ addition to Tank VI was continuous at a rate of 400 ml every hour, with continuous overflow through Tank VII to Tank VIII to Tank I. In this way, each tank was provided with fresh solution and metal dragover was transferred backwards to maintain low metals levels in rinse tanks VI and VII.

After timed intervals, samples were taken from all eight tanks. All samples were analyzed for several metal concentrations on a Thermo-Jarrell-Ash, plasma 300 Inductively-Coupled Plasma Emission Spectrometer (ICP). Results are shown in Table 2.

TABLE 2

Results of a Continuous-Operation Laboratory Pilot Plant Test of the Steady-State System

| Elapsed Time (Hours) 1200 ppm input | Iron Concentration (Parts per Million) TANKS | | | | | | | |
|---|---|---|---|---|---|---|---|---|
| | I | II | III | IV | V | VI | VII | VIII |
| 0 | 0 | 0 | 0 | 0 | 0 | 0 | 0 | 0 |
| 0.5 | 19.1 | 1.05 | 0.60 | 0 | 0 | 0 | 1.0 | 1640 |
| 1.0 | 20.0 | 1.12 | 0.62 | 0.04 | 0 | 0.79 | 4.0 | 3240 |
| 1.5 | 18.7 | 1.20 | 0.61 | 0.02 | 0.01 | 0.79 | 6.3 | 4790* |
| 2.0 | 21.2 | 1.16 | 0.59 | 0.00 | 0.02 | 0.89 | 8.7 | 4870** |
| 3.0 | 22.6 | 1.11 | 0.60 | 0.01 | 0.01 | 0.93 | 13.7 | 4900 |
| 4.0 | 21.7 | 1.10 | 0.62 | 0.1 | 0.07 | 0.87 | 15.3 | 5094 |
| 6.0 | 19.8 | 0.97 | 0.61 | 0.09 | 0.12 | 0.98 | 27.1 | 4753 |
| 10.0 | 21.3 | 0.99 | 0.58 | 0.07 | 0.23 | 1.57 | 35.7 | 4890 |

*Start electrowinning.
**Start counter flow of $Na_2SO_4$ in Tanks VI-VII-VIII-I.

EXAMPLE 3

Zinc Removal and Electroreduction

To evaluate the effectiveness of the steady-state system to remove zinc from a solution of approximately 100 parts/million (ppm) zinc in zinc chloride plating rinse water, the following experiment was carried out using the lab model of Example 1.

250 ml Purolite C-100 Cation Exchanger was placed into each of the eight tanks of the laboratory pilot steady-state system. Tanks I, II, III, IV, and V were filled with tap water to a total volume of approximately 2.5 L, producing 10% media suspensions by volume. Tanks VI, VII, and VIII were filled with 1.0 Molar $Na_2SO_4$ in 0.2 Normal $H_2SO_4$.

Three stainless steel cathodes, 5"×5", and three lead anodes, 5"×5", were installed in Tank VIII. Each tank was stirred with impellers.

A zinc chloride solution was prepared by diluting MacDermid chlorozinc solution with tap water to a concentration of approximately 100 ppm zinc. This solution was pumped into Tank I at a rate of 480 ml/min (691 L/day). The electroreduction was carried out with 15 A, at 10 V per cathode plate. Cation exchange resin (C-100 Purolite, Hydrogen form) was transferred between the tanks at the rate of 30 ml every 30 minutes (approximately 1 tank change every 4 hours). Sodium sulfate addition to Tank VI was performed every 30 minutes. A 25 ml portion of 1.0 M sodium sulfate in 0.2 N sulfuric acid was added; 25 ml of solution was then transferred from Tank VI to Tank VII, from VII to VIII, from VIII to I.

Samples were taken from all eight tanks at timed intervals. All samples were analyzed for zinc concentration on a Thermo-Jarrell-Ash plasma 300 Inductively-Coupled Plasma Emission Spectrometer (ICP). Results are shown in Table 3.

TABLE 3

Results of a Continuous-Operation Laboratory Pilot Plant Test of the Steady-State System

| Elapsed Time (Minutes) Input 95 ppm Zinc Rinse Waste Water | Zinc Concentration (Parts per Million) TANKS | | | | | | | |
|---|---|---|---|---|---|---|---|---|
| | I | II | III | IV | V | VI | VII | VIII |
| 15 | 11 | 2.2 | 0.58 | 0.17 | 1.8 | 2.2 | 11 | 22 |
| 45 | 11 | 1.5 | 0.24 | 0.14 | 0.5 | 1.5 | 4.2 | 88 |
| 75 | 11 | 1.5 | 0.25 | 0.20 | 0.4 | 3.0 | 6.8 | 210 |
| 110 | 11 | 1.0 | 0.10 | 0.01 | 0.5 | 3.3 | 5.9 | 400 |
| 135 | 16 | 2.1 | 0.22 | 0.01 | 0.01 | 3.9 | 11 | **420* |
| 165 | 12 | 1.0 | 0.08 | 0.01 | 0.19 | 3.7 | 24 | 400 |
| 195 | 17 | 2.4 | 0.26 | 0.02 | 0.02 | 2.3 | 23 | 460 |
| 225 | 12 | 1.3 | 0.11 | 0.02 | 0.02 | 3.0 | 22 | 459 |
| 255 | 14 | 1.5 | 0.14 | 0.04 | 0.04 | 4.4 | 25 | 453 |
| 290 | 14 | 1.6 | 0.14 | 0.04 | 0.04 | 4.2 | 21 | 439 |
| 350 | 16 | 1.9 | 0.10 | 0.02 | 0.03 | 4.0 | 25 | 455 |
| 390 | 13 | — | — | 0.07 | 0.02 | 4.1 | 23 | 460 |
| 425 | 16 | 1.5 | 0.05 | 0.01 | 0.03 | 4.0 | 24 | 455 |

*Electrowinning on.
**Start counterflow.

EXAMPLE 4

Industrial Cooper and Nickel Removal and Electroreduction from Plating Rinse Water To evaluate he effectiveness of the steady-state system to remove copper/nickel from plating rinse water, the following experiment was carried out using the lab model of Example 1.

250 ml Purolite C-100 Cation Exchanger was placed into each of eight tanks in the laboratory pilot steady-state system. Tanks I, II, III, IV, and V were filled with tap water to a total volume of approximately 2.5 L, producing 10% media suspensions by volume. Tanks VI, VII, and VIII were filled with 1.0 Molar $Na_2SO_4$ in 0.2 Normal $H_2SO_4$.

Three copper cathodes, 5"×5", and three platinized titanium anodes, 5"×5", were installed in Tank VIII. Each tank was stirred with impellers.

A solution of copper (270 ppm) and nickel (190 ppm) was pumped into Tank I at a rate of 500 ml/min (720 L/day). The electroreduction was carried out with 5 A, at 1.5 V per cathode plate. Cation exchange resin (C-100 Purolite, Sodium form) was transferred between the tanks at the rate of 125 ml every 30 minutes (1 tank change every hour). To Tank VI 1.0 M sodium sulfate—0.2 N $H_2SO_4$ was added at a rate of 250 ml/hr. Overflow from Tank VI was transferred to Tank VII, from VII to VIII, and from VIII to I.

Samples were taken from all eight tanks at timed intervals. All samples were analyzed for metal concentrations on a Thermo-Jarrell-Ash plasma 300 Inductively-Coupled Plasma Emission Spectrometer (ICP). Results are shown in Tables 4 and 5.

TABLE 4

Results of a Continuous-Operation Laboratory Pilot Plant Test of the Steady-State System

| Elapsed Time (Hrs.) Input: Cu 270 ppm Ni 190 ppm | Copper Concentration: (Parts per Million) TANKS | | | | | | | |
|---|---|---|---|---|---|---|---|---|
| | I | II | III | IV | V | VI | VII | VIII |
| 0.5 | 57 | 6.7 | 2.9 | 0.21 | 0.0 | 0.01 | 2.3 | 2010 |
| 1.0 | 56 | 5.8 | 2.3 | 0.19 | 0.0 | 0.21 | 4.7 | 4370 |
| 1.5 | 59 | 5.3 | 2.1 | 0.11 | 0.01 | 0.33 | 9.3 | 7010* |

TABLE 4-continued

Results of a Continuous-Operation Laboratory
Pilot Plant Test of the Steady-State System

| Elapsed Time (Hrs.) Input: Cu 270 ppm Ni 190 ppm | Copper Concentration: (Parts per Million) TANKS | | | | | | |
|---|---|---|---|---|---|---|---|
| | I | II | III | IV | V | VI | VII | VIII |
| 2.0 | 55 | 5.7 | 1.9 | 0.11 | 0.03 | 0.44 | 1.2 | 7210** |
| 5.0 | 54 | 5.3 | 2.0 | 0.12 | 0.01 | 0.57 | 2.5 | 7275 |
| 10.0 | 57 | 5.7 | 2.0 | 0.13 | 0.04 | 0.72 | 3.7 | 7327 |
| 15.0 | 58 | 5.6 | 2.0 | 0.16 | 0.01 | 1.3 | 4.5 | 7254 |
| 24 | 60 | 6.1 | 1.9 | 0.11 | 0.01 | 1.3 | 4.6 | 7312 |
| 36 | 57 | 5.8 | 2.0 | 0.09 | 0.05 | 1.2 | 12.7 | 7287 |
| 42 | 56 | 5.8 | 2.1 | 0.11 | 0.02 | 1.3 | 10.8 | 7378 |
| 48 | 57 | 5.8 | 2.3 | 0.13 | 0.02 | 1.2 | 8.3 | 7328 |

*Start electrowinning (deposits on cathodes were spongy, low grade).
**Start counter flow $Na_2SO_4$ in Tanks VI-VII-VIII-I.

TABLE 5

Results of a Continuous-Operation Laboratory
Pilot Plant Test of the Steady-State System

| Elapsed Time (Hrs.) | Nickel Concentration (Parts per Million) TANKS | | | | | | | |
|---|---|---|---|---|---|---|---|---|
| | I | II | III | IV | V | VI | VII | VIII |
| 0.5 | 31 | 3.3 | 0.33 | 0.0 | 0.00 | 0.00 | 1.6 | 1520 |
| 1.0 | 32 | 3.3 | 0.30 | 0.01 | 0.00 | 0.10 | 3.3 | 3210 |
| 1.5 | 35 | 3.3 | 0.31 | 0.01 | 0.01 | 0.20 | 6.8 | 4870* |
| 2.0 | 33 | 3.0 | 0.30 | (−0.03) | (−0.03) | 0.30 | 0.83 | 6520** |
| 5.0 | 33 | 2.9 | 0.32 | (−0.02) | (−0.01) | 0.42 | 1.8 | 6472 |
| 10.0 | 35 | 2.8 | 0.29 | (−0.01) | (−0.05) | 0.53 | 2.8 | 6351 |
| 15.0 | 32 | 3.2 | 0.31 | 0.00 | 0.03 | 0.75 | 2.9 | 6282 |
| 24 | 31 | 3.3 | 0.33 | 0.001 | 0.03 | 0.80 | 8.4 | 6210 |
| 36 | 35 | 3.2 | 0.31 | 0.01 | 0.02 | 0.81 | 7.4 | 6250 |
| 48 | 37 | 3.4 | 0.29 | 0.01 | 0.03 | 0.83 | 1.8 | 6270 |

*Start electrowinning.
**Start counter flow $Na_2SO_4$ in Tanks VI-VII-VIII-I.
( ) Negative readings are result of sample metal concentration appearing lower than "zero" standard.

EXAMPLE 5

Industrial Chelated-Copper Removal and Electroreduction

To evaluate the effectiveness of the steady-state system to remove chelated copper from approximately 55 parts/million (ppm) copper plating rinse water, the following experiment was carried out using the lab model of Example 1.

1 liter Rohm & Haas Amberlite IRC-718 (sodium form) resin was placed into each of eight tanks in the laboratory pilot steady-state system. Tanks I, II, III, IV, and V were filled with tap water to a total volume of approximately 3.0 L. Tanks VI, VII, and VIII were filled with 1.0 Molar $Na_2SO_4$ in 0.2 Normal $H_2SO_4$.

Two copper cathodes, 5"×5", and two platinized titanium anodes, 5"×5", were installed in Tank VIII. Each tank was stirred with impellers.

A 55 ppm chelated copper plating rinse solution was pumped into Tank I at a rate of 166 ml/min (239 L/day). The electroreduction was carried out with 5 A, at 1.5 V per cathode plate.

Chelating resin (IRC-718) was transferred between the tanks at the rate of 125 ml every 30 minutes (1 tank change of medium every 4 hours). Sodium sulfate addition to Tank VI was performed every 60 minutes. A 10 ml portion of 1.0 M sodium sulfate in 0.2 N sulfuric acid was added; 10 ml of solution was then transferred from Tank VI to Tank VII, from VII to VIII, and from VIII to I.

Samples were taken from all eight tanks at timed intervals. All samples were analyzed for copper concentration on a Thermo-Jarrell-Ash plasma 300, Inductive-ly-Coupled Plasma Emission Spectrometer (ICP). Results are shown in Table 6.

TABLE 6

Results of a Continuous-Operation Laboratory
Pilot Plant Test of the Steady-State System

| Elapsed Time (Hrs.) Input 55 ppm Chelated Copper Rinse Water | Copper Concentration (Parts per Million) TANKS | | | | | | | |
|---|---|---|---|---|---|---|---|---|
| | I | II | III | IV | V | VI | VII | VIII |
| 0 | | | | | | | | |
| 0.5 | 22 | 5.6 | 1.5 | 0.11 | −0.01 | 0.01 | 4.0 | 47 |
| 1.0 | 21 | 5.9 | 1.8 | 0.10 | 0.00 | 0.04 | 12 | 188 |
| 1.5 | 22 | 5.6 | 2.1 | 0.09 | 0.02 | 0.1 | 17 | 251 |
| 2.0 | 23 | 5.5 | 1.8 | 0.09 | 0.01 | 0.7 | 16 | 357 |
| 5.0 | 21 | 5.5 | 1.7 | 0.12 | 0.01 | 0.8 | 18 | 921 |
| 10 | 24 | 5.5 | 1.7 | 0.09 | 0.03 | 1.2 | 23 | 1920 |
| 15 | 21 | 5.3 | 1.6 | 0.11 | 0.02 | 1.3 | 37 | *3140** |
| 24 | 20 | 5.1 | 1.8 | 0.10 | 0.01 | 1.2 | 36 | 3260 |
| 36 | 22 | 5.7 | 1.8 | 0.11 | 0.01 | 1.2 | 35 | 3240 |
| 48 | 21 | 5.3 | 1.8 | 0.12 | 0.02 | 1.2 | 36 | 2960 |

*Electrowinning on.
**Start counter flow $Na_2SO_4$ in Tanks VI-VII-VIII-I

EXAMPLE 6

Cadmium Removal and Electroreduction

To evaluate the effectiveness of the steady-state system to remove cadmium from approximately 100 parts/million (ppm) cadmium plating rinse water, the following experiment was carried out using the system of Example 1.

250 ml Purolite C-100 Cation Exchanger was placed into each of the eight tanks of the laboratory pilot steady-state system. Tanks I, II, III, IV, and V were filled with tap water to a total volume of approximately 2.5 L, producing 10% media suspensions by volume. Tanks VI, VII and VIII were filled with 1.0 Molar $Na_2SO_4$ in 0.2 Normal $H_2SO_4$.

Two copper cathodes, 5"×5", and two platinized titanium anodes, 5"×5", were installed in Tank VIII. Each tank was stirred with impellers.

Cadmium plating rinse water was pumped into Tank I at a rate of 255 ml/min (367 L/day). The electroreduction was carried out with 5 A, at 1.5 V per cathode plate.

Cation exchange resin (C-100 Purolite, Hydrogen form) was transferred between the tanks at the rate of 30 ml every 30 minutes (approximately 1 tank change every 4 hours). Sodium sulfate addition to Tank VI was performed every 60 minutes. A 25 ml portion of 1.0 M sodium sulfate in 0.2 N sulfuric acid was added, and 25 ml of solution was then transferred from Tank VI to Tank VII, from VII to VIII, and from VIII to I.

Samples were first taken from Tanks I to IV, inclusive, and after several intervals, from all eight tanks at every subsequent interval. All samples were analyzed for cadmium concentration on the Thermo-Jarrell-Ash, Inductively-Coupled Plasma Emission Spectrometer (ICP). Results are shown in Table 7.

TABLE 7

Results of a Continuous-Operation Laboratory Pilot Plant Test of the Steady-State System

| Elapsed Time (Hrs.) Input 63 ppm Cadmium Rinse Water | Cadmium Concentration (Parts per Million) TANKS | | | | | | | |
|---|---|---|---|---|---|---|---|---|
| | I | II | III | IV | V | VI | VII | VIII |
| 0 | 0 | 0 | 0 | 0 | 0 | 0 | 0 | 0 |
| 0.5 | 23 | 2.1 | 0.09 | 0.00 | −0.01 | 0.01 | 3.0 | 36 |
| 1.0 | 17 | 1.7 | 0.27 | 0.00 | −0.01 | 0.04 | 13 | 137 |
| 1.5 | 17 | 1.6 | 0.14 | 0.01 | 0.00 | 0.1 | 16 | 375 |
| 3.0 | 15 | 1.5 | 0.13 | 0.02 | 0.00 | 0.5 | 16 | 1021 |
| 5.0 | 15 | 1.5 | 0.17 | 0.01 | 0.01 | 0.7 | 18 | 2075 |
| 10 | 17 | 1.5 | 0.17 | 0.01 | 0.00 | 1.3 | 19 | **3280* |
| 15 | 18 | 1.7 | 0.17 | 0.00 | 0.01 | 1.2 | 21 | 3260 |
| 24 | 19 | 1.5 | 0.10 | 0.04 | 0.02 | 1.1 | 21 | 3240 |
| 36 | 17 | 1.7 | 0.16 | 0.01 | 0.00 | 1.2 | 20 | 3175 |
| 40 | 18 | 2.0 | 0.10 | 0.01 | 0.00 | 1.2 | 24 | 3210 |
| 45 | 21 | 2.0 | 0.15 | 0.00 | 0.01 | 1.2 | 25 | 3215 |
| 55 | 19 | 1.9 | 0.13 | 0.01 | 0.01 | 1.2 | 25 | 3175 |
| 60 | 20 | 1.9 | 0.14 | 0.01 | 0.00 | 1.2 | 25 | 3193 |

*Electrowinning on.
**Start counterflow.

What is claimed is:

1. A method for removal of at least one contaminant from a liquid containing same, said method comprising:
   introducing said liquid containing said contaminant into a first of a plurality of liquid treatment containers;
   contacting said liquid in said first liquid treatment container with a first quantity of a solid contaminant recovery medium for removing said contaminant from aid liquid in a liquid-medium suspension for a period of time sufficient to achieve a desired efficiency of recovery of said contaminant;
   cycling said liquid from said first liquid treatment container sequentially through each of said plurality of liquid treatment containers to a final liquid treatment container while contacting said liquid in each of said liquid treatment containers with additional quantities of said medium in liquid-medium suspension for period of time sufficient to achieve said desired efficiency of recovery in each of said liquid treatment containers;
   cycling at least a portion of said medium from said final liquid treatment container through said plurality of liquid treatment containers to said first liquid treatment container in a direction countercurrent to flow of said liquid so as to maintain essentially a constant medium concentration in each of said liquid treatment containers, said medium being substantially separated from liquid prior to cycling from one container to another container;
   transferring at least a portion of said medium from said first liquid treatment container into a medium recycling means comprising a plurality of medium recovery containers wherein said medium is treated with a contaminant recovery liquid for regenerating said medium;
   cycling said medium from a first medium recovery container sequentially through said plurality of medium recovery containers to a final medium recovery container;
   cycling said contaminant recovery liquid from said final medium recovery container through said plurality of medium recovery containers to said first medium recovery container in a direction countercurrent to flow of said medium through said medium recycling means, whereby said medium is at least partially regenerated; and
   reintroducing at least a portion of said at least partially regenerated medium from said final medium recovery container into said final liquid treatment container.

2. A method according to claim 1, further comprising discharging substantially purified liquid from said final liquid treatment container.

3. A method according to claim 1, further comprising recovering said contaminant in said medium recycling means.

4. A method according to claim 1, wherein said contaminant is dissolved metal.

5. A method according to claim 1, wherein said contaminant recovery medium is an ion exchange medium.

6. A method according to claim 1, wherein said contaminant recovery liquid serves as an electrolyte for recovery of metal in said medium recycling means by electrowinning.

7. A method according to claim 6, wherein said contaminant recovery liquid comprises a concentrated salt solution.

8. A method according to claim 7, wherein said concentrated salt solution is supplied to said final medium recovery container from an auxiliary container, said salt solution being maintained at a concentrated level by maintaining a visible supply of solid salt in said container.

9. A method according to claim 8, wherein said salt comprises $Na_2SO_4$ and said salt solution is acidic.

10. A method according to claim 1, wherein said liquid-medium suspension has a medium concentration in the range of about 0.5% volume/volume to about 50% volume/volume.

11. A method according to claim 1, wherein said liquid-medium suspension is agitated.

12. A method according to claim 11, wherein said liquid-medium suspension is agitated by mechanical agitation means.

13. A method according to claim 11, wherein said liquid-medium suspension is agitated by air bubble means.

14. A method according to claim 11, wherein said liquid-medium suspension is agitated by liquid jet means.

* * * * *